(No Model.)
S. W. JONES.
MACHINE FOR POLISHING, CLEANING, AND SEPARATING NUTS, GRAIN, &c.
No. 250,444. Patented Dec. 6, 1881.
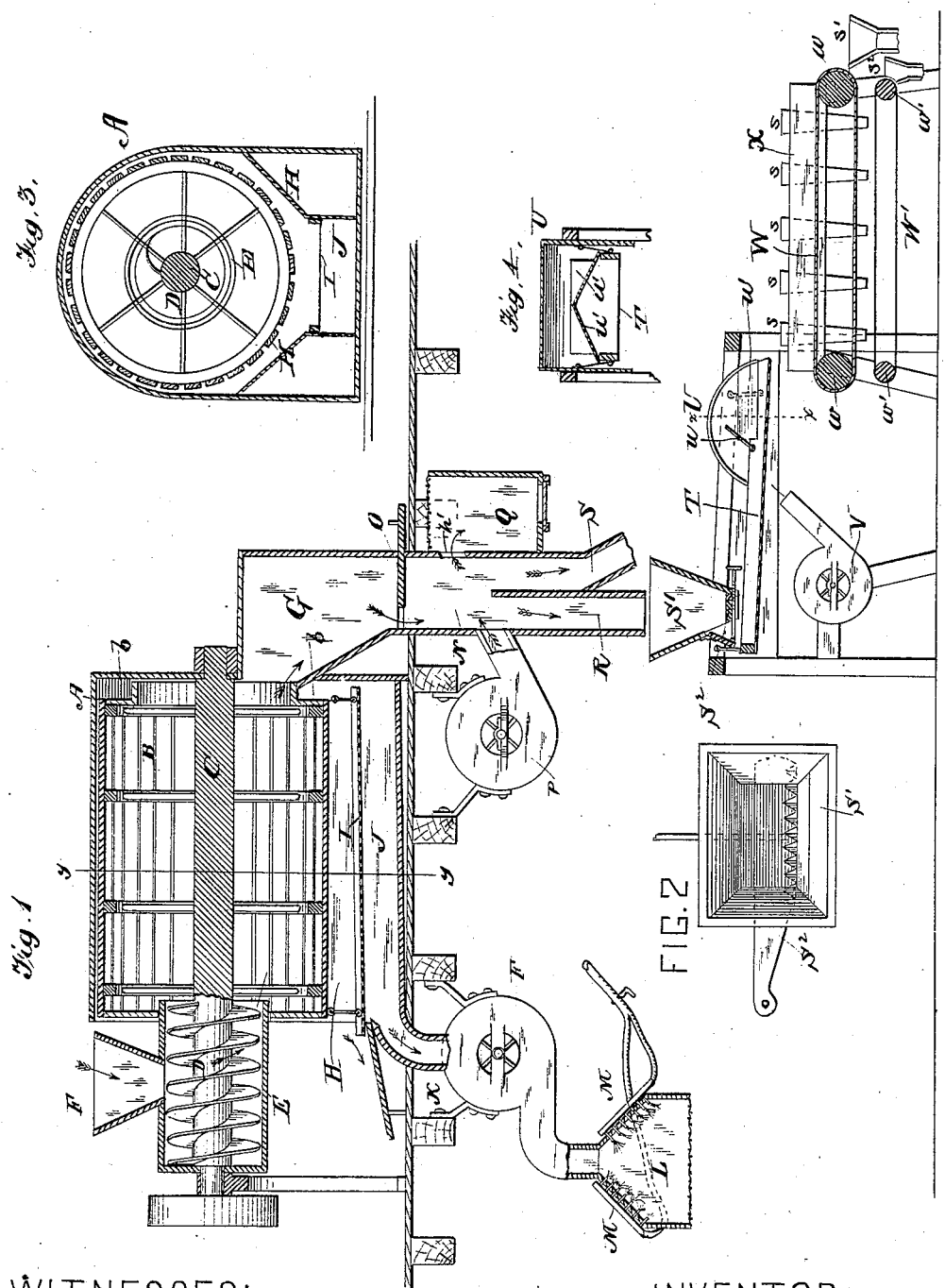
WITNESSES:
INVENTOR:
Stephen W. Jones

UNITED STATES PATENT OFFICE.

STEPHEN W. JONES, OF PETERSBURG, VIRGINIA.

MACHINE FOR POLISHING, CLEANING, AND SEPARATING NUTS, GRAIN, &c.

SPECIFICATION forming part of Letters Patent No. 250,444, dated December 6, 1881.

Application filed June 16, 1881. (No model.)

*To all whom it may concern:*

Be it known that I, STEPHEN W. JONES, of Petersburg, in the county of Dinwiddie and State of Virginia, have invented certain new and useful Improvements in Machines for Cleaning, Polishing, and Separating Nuts, Grain, &c.; and I do hereby declare the following to be a full, clear, and exact description of the same, reference being had to the accompanying drawings, forming part of this specification, in which—

Figure 1 is a vertical section of the invention, and Fig. 2 a top-plan view of the hopper S'. Fig. 3 is a sectional view, taken on line $y$ $y$, Fig. 1. Fig. 4 is a sectional view, taken on line $x$ $x$, Fig. 1.

Similar letters of reference in the several figures denote the same parts.

This invention relates to machines for cleaning, polishing, and separating nuts, grain, &c.; and it consists in certain novelties of construction, which I will now proceed to describe.

In the drawings, A represents a casing, within which is arranged a cleaning and polishing cylinder, B, upon a revolving shaft, C. This cylinder is composed of longitudinal wooden slats secured at suitable distances apart to rims or fellies that are connected to the shaft by means of spokes, as shown. The shaft at one end extends out beyond the cylinder and carries a spiral conveyer or feeder, D, which works in a case or jacket, E.

F is a hopper arranged upon the case E, and adapted to receive and conduct to the case E the nuts or other material to be treated. The feed end or head of the cylinder is closed, except at its center, where an opening is made for the passage of the shaft and the accommodation of the case E, while the discharge end or tail of said cylinder is left open, a short inwardly-projecting flange, $b$, only being left to prevent the too rapid discharge of the material from the cylinder into a receiving-hopper, G.

H H are angle-boards, which collect the dirt, chaff, and hulls which fall through between the slats of the cylinder and direct them onto a slightly-inclined shaking screen or sieve, I. This screen is covered with wire-cloth of a mesh that will allow the fine dust, chaff, &c., to pass through it into a trough or chute, J, beneath, but cause the larger separated material to be tailed off into a suitable receptacle at the end of the screen.

K is an air trunk or spout leading from trough J, and F an exhaust-fan for drawing off the fine dust, &c., from said trough and forcing it to a dust-receptacle, L, provided with spray-pipes M, for condensing the dust, and having its lower portion covered with fine wire-cloth to allow the air to escape.

N is a large spout connected to the bottom of the hopper G, and O a valve or cut-off arranged between said hopper and spout.

P is a fan adapted to direct a blast or sheet of air obliquely across the spout N, and to carry any remaining chaff and hulls and other like light matter through an opening, $h'$, into a box or receptacle, Q, which has a wire-cloth top to permit the free escape of the air.

R is a branch of the spout N next the blower or fan P, down which the heavier nuts, &c., pass, and S another branch of said spout farther from the fan, down which the lighter nuts, &c., pass.

S' is a hopper into which the heavy nuts, &c., are discharged from the spout-branch R. This hopper is provided with a hinged flap at the lower end of one of its sides, which flap is adapted to be opened and closed by means of a screw, to give a greater or less discharge. Said hopper is further provided with a distributer consisting of a board or plate, $S^2$, having notches in its edge next the hinged flap. A reciprocating motion is imparted to the distributer in any suitable manner, and in its movements it scatters or distributes the nuts so as to cause them to fall evenly on a wire-cloth shaking-screen, T. The latter is slightly inclined, and at the tail-end is provided with a hood, U, containing a movable angle-board, $u$, which extends transversely from side to side of the screen, and also containing chutes $u'$, as shown.

Beneath the screen T is arranged a fan, V, the object of which is to direct a blast or sheet of air up through the screen and into the hood for the purpose of separating from the nuts, &c., passing over the screen any light nuts not separated in the spout N, and carrying such light nuts up over the angle-board or deflector into the hood and down on the chutes $u'$, to be directed by the latter to opposite sides of the screen, where they are collected in bags or other receptacles. The nuts, as they pass over the tail of the screen T, are equally distributed upon an endless picking-apron, W, traveling over rollers w w, being prevented from falling over the edges by fenders X. Attendants stand at this apron and pick off by hand any discolored or objectionable nuts and cast them into one or another of a series of hoppers or spouts, s, arranged along the apron at suitable intervals, the remaining perfect nuts passing along and being delivered by the apron into a hopper, s', whence they are conducted to a suitable place for storing or being bagged. Those of the nuts picked out and cast into the hoppers or spouts s pass down through the latter and are delivered upon a second endless apron, W', which travels on rollers w' w'. This second apron, W', is narrower than apron W, and moves in a trough under the table in the middle. The nuts carried by it are delivered into a smaller hopper, $s^2$.

If desired, a number of spouts may lead from the spout R, and a number of hoppers, S', shaking screens T, and picking-aprons and their accessories be provided for receiving and manipulating the nuts delivered from such additional spouts.

The mechanism as a whole is peculiarly adapted to the cleaning, polishing, and grading of peanuts, but can be used in operating upon grain and other materials with good effect.

I claim as my invention—

1. The combination of the rotating slatted cylinder, the angle-boards below the same, the shaking screen, the trough below the screen, and the air-trunk leading from the trough with the suction-fan, the condensing-chamber, and the spray-pipes, substantially as described.

2. The combination of the revolving cylinder, and the hopper into which the nuts are delivered from the cylinder, with the spout N, having the branches R S, the fan P, and the receptacle Q, having the wire-cloth for the escape of air, substantially as described.

3. The combination of the shaking screen T, the hood U, containing a movable angle-board, u, and the chutes u', and the fan V, substantially as described.

STEPHEN W. JONES.

Witnesses:
ROBERT W. PRINCE,
WM. E. DRUMMOND.